(12) United States Patent
Shigaki (10) Patent No.: US 10,059,258 B2
(45) Date of Patent: Aug. 28, 2018

(54) ILLUMINATED PLATE FOR MOTOR VEHICLE

(71) Applicant: Nozomu Hope Shigaki, Irvine, CA (US)

(72) Inventor: Nozomu Hope Shigaki, Irvine, CA (US)

(73) Assignee: Nozomu Hope Shigaki, Irvine, CA (US)

( * ) Notice: Subject to any disclaimer, the term of this patent is extended or adjusted under 35 U.S.C. 154(b) by 0 days.

(21) Appl. No.: 15/389,364

(22) Filed: Dec. 22, 2016

(65) Prior Publication Data

US 2017/0101051 A1    Apr. 13, 2017

Related U.S. Application Data

(63) Continuation of application No. 14/193,390, filed on Feb. 28, 2014.

(51) Int. Cl.
| | |
|---|---|
| *B60Q 1/56* | (2006.01) |
| *B60R 13/10* | (2006.01) |
| *G09F 13/06* | (2006.01) |
| *G09F 13/22* | (2006.01) |
| *G09F 13/04* | (2006.01) |

(52) U.S. Cl.
CPC ............ *B60Q 1/56* (2013.01); *B60R 13/10* (2013.01); *G09F 13/06* (2013.01); *G09F 13/22* (2013.01); *G09F 2013/044* (2013.01); *G09F 2013/227* (2013.01)

(58) Field of Classification Search
CPC .... G09F 13/04; G09F 2013/227; G09F 13/22; G09F 21/04; B60Q 1/503
See application file for complete search history.

(56) References Cited

U.S. PATENT DOCUMENTS

| | | | |
|---|---|---|---|
| 1,118,866 A | 11/1914 | Jones | |
| 1,386,018 A | 8/1921 | Other | |
| 1,433,314 A | 10/1922 | Wagner | |
| 1,567,070 A | 12/1925 | Maillot | |
| 1,667,126 A | 4/1928 | Martin | |
| 1,698,681 A | 1/1929 | Hines | |
| 2,079,468 A | 5/1937 | Schirmer | |
| 2,122,027 A | 6/1938 | Czarny et al. | |
| 2,124,829 A | 7/1938 | Rioux | |
| 2,193,058 A | 3/1940 | Carver | |
| 2,875,539 A | 3/1959 | Gladd | |
| 3,828,454 A | 8/1974 | Bush et al. | |
| 4,255,887 A | 3/1981 | Murai | |

(Continued)

OTHER PUBLICATIONS

Advisory Action issued by U.S. Patent and Trademark Office, dated Dec. 15, 2016, for U.S. Appl. No. 14/193,390.

(Continued)

*Primary Examiner* — Cassandra Davis
(74) *Attorney, Agent, or Firm* — Law Office of Katsuhiro Arai (57) ABSTRACT

An illuminated plate for motor vehicles includes: a base sheet; an electroluminescent sheet; a background sheet which is transparent, translucent, or reflective, and which has a cutout section constituted by openings shaped in characters for display; character inserts which are transparent or translucent and shaped in the characters, which character inserts are infixed in the corresponding openings of the characters in the cutout section; and a clear cover sheet.

13 Claims, 4 Drawing Sheets

(56) References Cited

U.S. PATENT DOCUMENTS

| | | |
|---|---|---|
| 4,645,970 A | 2/1987 | Murphy |
| 4,848,017 A | 7/1989 | Bailey et al. |
| 4,976,057 A | 12/1990 | Bianchi |
| 5,005,306 A | 4/1991 | Kinstler |
| 5,073,842 A | 12/1991 | Monroe |
| 5,150,960 A | 9/1992 | Redick |
| 5,497,572 A | 3/1996 | Hoffman |
| 5,533,289 A | 7/1996 | Hoffman |
| 5,542,200 A | 8/1996 | Matsuoka |
| 5,692,327 A | 12/1997 | Wynne et al. |
| 6,404,334 B1 | 6/2002 | Chao |
| 6,478,458 B2 | 11/2002 | Hickman |
| 6,698,118 B2 | 3/2004 | Tietze et al. |
| 6,706,342 B2 | 3/2004 | Kong et al. |
| 7,086,769 B1 | 8/2006 | Thompson et al. |
| 7,160,007 B2 | 1/2007 | Pan |
| 7,162,821 B2 | 1/2007 | Venkataraman et al. |
| 7,210,830 B1 | 5/2007 | Mayo |
| 7,387,397 B2 | 6/2008 | Konet et al. |
| 7,430,822 B1 | 10/2008 | Combs |
| 7,582,000 B2 | 9/2009 | Pendlebury et al. |
| 7,752,790 B1 | 7/2010 | Michael et al. |
| 8,016,467 B2 | 9/2011 | Eberwein |
| 2003/0226299 A1 | 12/2003 | Chou |
| 2010/0014133 A1 | 1/2010 | Whiteside et al. |
| 2010/0132232 A1 | 6/2010 | Frisch |
| 2012/0055055 A1 | 3/2012 | Kunowski |

OTHER PUBLICATIONS

Advisory Action issued by U.S. Patent and Trademark Office, dated Jan. 5, 2016, for U.S. Appl. No. 14/193,390.

Final Office Action issued by U.S. Patent and Trademark Office, dated Aug. 25, 2016, for U.S. Appl. No. 14/193,390.

Final Office Action issued by U.S. Patent and Trademark Office, dated May 28, 2015, for U.S. Appl. No. 14/193,390.

Non-Final Office Action issued by U.S. Patent and Trademark Office, dated Jan. 14, 2016, for U.S. Appl. No. 14/193,390.

Non-Final Office Action issued by U.S. Patent and Trademark Office, dated Oct. 3, 2014, for U.S. Appl. No. 14/193,390.

ILLUMINATED PLATE FOR MOTOR VEHICLE

BACKGROUND OF THE INVENTION

Field of the Invention

The present invention generally relates to an illuminated plate for motor vehicles, such as a license plate.

Description of the Related Art

The conventional license plate is integral for vehicle identification and for traffic officials for checking data about automobiles. This type of license plate is easy to monitor during the daytime, but can be rather challenging to view or check during the nighttime. Incandescent lights are used as the conventional license plate lights, but do not provide sufficient intensity of illumination to readily recognize the license plate number at night from a distance, particularly while the vehicle is moving.

Illuminated license plates are known. However, many of them are ineffective in distinctly illuminating the license plates at night from a distance. Further, many of them require significant structural changes and cannot readily be substituted for the conventional license plates. Additionally, many of them require significant manufacturing process changes and cannot readily be manufactured using the present manufacturing system. Currently, the California Prison Industry Authority (CALPIA)—a State-operated agency—oversees the production of license plates at Folsom. There is no known illuminated license plate which is effective in illuminating the license plate numbers at night from a distance, and which can readily be manufactured and can readily structurally be substituted for the conventional license plates.

Any discussion of problems and solutions in relation to the related art has been included in this disclosure solely for the purposes of providing a context for the present invention, and should not be taken as an admission that any or all of the discussion was known at the time the invention was made.

SUMMARY OF THE INVENTION

Some embodiments provide an illuminated plate comprising: (i) a base sheet; (ii) an electroluminescent sheet for providing illumination, which electroluminescent sheet is overlaid on the base sheet; (iii) a background sheet which is transparent, translucent, or reflective, and which has a cutout section constituted by openings shaped in characters for display, which background sheet is overlaid on the electroluminescent sheet; (iv) character inserts which are transparent or translucent and shaped in the characters, which character inserts are infixed in the corresponding openings of the characters in the cutout section, wherein the background sheet and the character inserts have different transparent colors and shades; and (v) a clear cover sheet which is overlaid on the background sheet and the character inserts for protection. The above features can effectively resolve at least one of the problems discussed above. The illuminated plate can be an innovative and alternative approach to vehicle identification and registration as a license plate or dealer identification, and advertizing as a dealer plate. The illuminated plate can have good weatherproofing, increased visibility and durability with a strong light brilliance. This type of license plate can ensure increased safety as well as additional revenue, extended services, and further support personalized license plate enthusiasts. Government and private agencies can seamlessly adopt and incorporate this product into their current production systems. As a license plate, the illuminated plate can allow for manufacturing agencies to capture a new market and technology for plate production. Further, as a dealer plate, the illuminated plate can allow for auto dealership's manufacturing agencies to capture a new market and technology for vehicle plate production.

In some embodiments, an illuminated dealer plate temporarily installed to a motor vehicle in place of a license plate comprises: (a) a base sheet configured to be mounted to a motor vehicle; (b) an electroluminescent sheet for providing illumination configured to be connected to an inverter, said electroluminescent sheet being overlaid on the base sheet; (c) a dealer sheet which is transparent, translucent, or reflective, and which includes a print layer formed thereon, said dealer sheet being overlaid on the electroluminescent sheet; and (d) a clear cover sheet which is overlaid on the dealer sheet for protection so that the dealer sheet with the print layer is visible through the clear cover sheet. In the above, the dealer sheet corresponds to the background sheet and character inserts of the plate according to the other embodiments, and can realize similar advantages to those of the other embodiments disclosed herein.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DETAILED DESCRIPTION OF EMBODIMENTS

In this disclosure, an article "a" or "an" refers to a species or a genus including multiple species. For example, a "sheet" may refer to a single sheet or multiple sheets as long as the sheets are integrated and treated as one sheet or may refer to a type of sheet regardless of the number of sheets. The "sheet" may refer also to a plate-shaped structure which may be flexible or rigid. Further, in this disclosure, any two numbers of a variable can constitute a workable range of the variable as the workable range can be determined based on routine work, and any ranges indicated may include or exclude the endpoints. Additionally, any values of variables indicated (regardless of whether they are indicated with "about" or not) may refer to precise values or approximate values and include equivalents, and may refer to average, median, representative, majority, etc. in some embodiments. The term "constituted by" refers to "comprising", "consisting essentially of", or "consisting of" in some embodiments. In this disclosure, any defined meanings do not necessarily exclude ordinary and customary meanings in some embodiments.

In the present disclosure where conditions and/or structures are not specified, the skilled artisan in the art can readily provide such conditions and/or structures, in view of the present disclosure, as a matter of routine experimentation.

In all of the disclosed embodiments, any element used in an embodiment can be replaced with any elements equivalent thereto, including those explicitly, necessarily, or inherently disclosed herein, for the intended purposes. Further, the present invention can equally be applied to apparatuses and methods.

An embodiment of the present invention provides an illuminated plate for motor vehicles, comprising: (i) a base sheet configured to be mounted to a motor vehicle; (ii) an electroluminescent sheet for flashing illumination configured to be connected to an inverter, said electroluminescent sheet being overlaid on the base sheet; (iii) a background sheet which is transparent, translucent, or reflective, and which has a cutout section constituted by openings shaped in characters for display, said background sheet being overlaid on the electroluminescent sheet; (iv) character inserts which are transparent or translucent and shaped in the characters, said character inserts being infixed in the corresponding openings of the characters in the cutout section, wherein the background sheet and the character inserts have different transparent colors and shades; and (v) a clear cover sheet which is overlaid on the background sheet and the character inserts for protection so that the character inserts and the background sheet are visible through the clear cover sheet. The "characters" refer to one or more numbers, one or more letters, one or more figures, one or more symbols, any combination of the foregoing, or any other indicia for identification, and include, but are not limited to, license plate numbers of motor vehicles, any indicia for dealer identification or advertisements (such as those temporarily used until license plate numbers are issued, which indicate dealers' names, logos, or any messages). In some embodiments, the plate can be installed at any desired places of a motor vehicle or any other objects.

In some embodiments, the background sheet includes a print layer formed thereon as a background of the characters. Since the background sheet is transparent, translucent, or reflective, the print layer can shine due to backlight or reflected light. However, since the background sheet and the character inserts have different transparent colors and shades, the character inserts are clearly recognizable due to the contrast in transparency and color. In some embodiments, the transparency of the character inserts is higher than that of the background sheet. The print layer may illustrate the licensing state such as "California" for a license plate. In addition, the print layer may illustrate a background design such as palm trees, beaches, and mountains. However, the background sheet need not have any print layer to illustrate any design.

The electroluminescent sheet can be of any suitable type. In some embodiments, the electroluminescent sheet is constituted by a laminate containing a phosphor layer. For example, the electroluminescent sheet disclosed in U.S. Pat. No. 7,582,000 can be employed, the disclosure of which is herein incorporated by reference in its entirety. In some embodiments, the electroluminescent (EL) sheet or strip is wired to a 12-volt DC input and connector with built-in reverse polarity protection, no-load protection, and short circuit protection, and a mounting platform is attached thereto. An EL strip is a thin solid-copper wire coated in a phosphor—all enclosed in a clear PVC sleeve. Its thin diameter makes it quite flexible and when applied to an alternating current, the strip will glow. An alternating current electric potential of approximately 90 to 120 volts is needed for the strip to emit light. The strip applied to an alternating current will in fact produce a 360° unbroken line of visible light for the illuminated license plate. This EL wire is placed in between the base sheet and the background sheet and serves as the light source for the illuminated plate. In some embodiments, the inverter is connected to an electric source which is used for incandescent light bulbs (OEM bulbs) used as the conventional license plate lights by rerouting the electricity from the OEM bulbs to the EL sheet. Alternatively, the inverter can be connected in parallel with the OEM bulbs to the same electric source as for the OEM bulbs. Typically, the thickness of the EL sheet is in a range of about 200 μm to about 2,000 μm (preferably, about 500 μm to about 1,000 μm, typically about 700-800 μm). The EL sheet may also have a color filter laminated thereon to change illuminated color, and a thickness of the color filer may be about 400-700 μm.

In some embodiments, the background sheet is transparent or translucent and includes a print layer formed thereon so that the background sheet with the print layer illuminates using the EL sheet as a background of the characters. Any suitable plastic material can be used, such as such as polyester, polypropylene, and vinyl. Although the print layer on the background sheet can be formed by any printing process such as inkjet printing, thermal transfer printing is preferable. Thermal transfer printing (e.g., 3M™ Digital License Plate (DLP) Thermal Transfer Ribbons Series TTR1300) is a digital printing process where material is applied to another object by melting a coating of ribbon to ensure that the material stays glued to the object, which the print is applied to. Printers use a fixed-width thermal print head, pressing onto a plastic or paper label, over a driven rubber roller called a platen. Sandwiched between the print head and the label is a very thin thermal transfer ribbon, which is a polyester film which has been coated on the label side with a wax, wax-resin or pure resin "ink." The printing process is quick and can account for the fast speed of the printers, and the ink sets instantly. The thermal transfer prints can provide color and UV protection and help increase the plate's durability. In some embodiments, the print layer is thin enough to be translucent (i.e., allowing light to pass therethrough) while maintaining a contrast between the intensity of illumination of the background sheet and that of the character inserts.

Alternatively, the background sheet is reflective and includes a print layer formed thereon. When reflectivity of the license plate is required by law, the background sheet is made reflective (i.e., capable of shining by reflecting light therefrom). Reflective sheeting can be of any suitable type. For example, 3M's reflective sheeting can effectively be used (e.g., 3M™ Digital License Plate (DLP) Reflective License Plate Sheeting Series 9250E/9250T). Further, it can be used along with 3M's reflective ink for printing, ensuring good reflectivity and legibility. Also, any suitable reflective paint can be used on the background sheet. In some embodiments, the reflective background sheet is opaque where when light is emitted onto the background sheet, the background sheet entirely shines due to reflection of light and also the character inserts shine due to backlight from the EL sheet at night, whereas when no light is emitted onto the background sheet, only the character inserts shine and are visible and distinctively stand out at night.

The background sheet has a cutout section constituted by openings shaped in characters for display where the character inserts are infixed so that light emitted from the EL sheet passes through the character inserts without passing through the background sheet. Typically, the thickness of the background sheet is in a range of about 50 µm to about 1,000 µm (preferably, about 100 µm to about 500 µm, typically about 200-300 µm).

In some embodiments, the character inserts can be made of any suitable material, such as vinyl, which is transparent or translucent and, as a material, has a different transparent color and/or shade from that of the material of which translucent background sheet is made when the background sheet is also transparent or translucent. In some embodiments, the background sheet (as a material) is in white or a white-based color whereas the character inserts (as a material) are in a blue or green color, enhancing a contrast when they shine. In some embodiments, the background sheet and the character inserts have substantially the same thickness. In some embodiments, the character inserts are slightly smaller than the openings of the characters. In these embodiments, the contour of each character can more intensively shine than the character itself since a gap is formed along the contour of each character, through which more light passes than passes through each character, thereby rendering the character more distinctive at night.

In some embodiments, the base sheet is for supporting the EL sheet overlaid on the base sheet, the background sheet with the character inserts overlaid on the EL sheet, and the clear cover sheet overlaid on the background sheet with the character inserts, and is configured to be mounted to a motor vehicle at any desired places thereof or any other objects. In some embodiments, the base sheet is rigid whereas the other sheets are flexible. In some embodiments, the base sheet is made of fiberglass. Alternatively, the base sheet is made of aluminum. There is no particular restriction imposed on the dimensions of the base sheet, but the base sheet may be formed in the same dimensions as a conventional license plate (e.g., a height of 6 inches and a width of 12 inches) with round edges. The base sheet may have vehicle bolt holes for attachment, wherein the other sheets may have the corresponding holes so that all of the sheets can be installed to a vehicle using bolts. Typically, the thickness of the base sheet is in a range of about 1.0 mm to about 3.0 mm (preferably, about 1.5 mm to about 2.0 µm, typically about 1.6 mm).

The clear cover sheet is the outermost layer exposed to the atmosphere, which provides durability and weatherability to the illuminated plate. The clear cover sheet can be made of any suitable plastic materials such as polyester, polypropylene, etc. Typically, the thickness of the clear cover sheet is in a range of about 50 µm to about 1,000 µm (preferably, about 100 µm to about 500 µm, typically about 200-300 µm). For a dealer plate, the cover sheet may be made of vinyl which is not as durable as polyester, because the dealer plate is for temporally use only. In some embodiments, the sealing structures disclosed in U.S. patent application publication No. 2010/0014133 can be applied to any of the embodiments disclosed herein, the disclosure of which is herein incorporated by reference in its entirety.

In some embodiments, a backside of each of the electroluminescent sheet, the background sheet, the character inserts, and the clear cover sheet has an adhesive layer for adhering to the underlying sheet. The adhesive layer can be made of any suitable material such as acrylic resin. Preferably, the adhesive is a pressure-sensitive permanent adhesive. In some embodiments, a sheet from which the background sheet is made has multiple layers composed of a main sheet constituting the background sheet, an adhesive layer formed on a backside of the main sheet, and a backing film formed on a backside of the adhesive layer, so that the cutout section of the background sheet can readily be formed on the backing film, and the backing film is removed when attaching the background sheet to the underlying sheet (the EL sheet). The character inserts can be made from a sheet having a similar laminate structure to the background sheet, so that the character inserts can readily be formed on the backing film, and the backing film is removed when attaching the character inserts to the underlying sheet (the EL sheet). The clear cover sheet also can be made from a sheet having a similar laminate structure, so that the clear cover sheet can readily adhere to the underlying sheet (the background sheet and the character inserts) by removing the backing film. In some embodiments, each of the electroluminescent sheet, the background sheet, the character inserts, and the clear cover sheet can adhere to the underlying sheet by applying an adhesive on a backside of each sheet. In some embodiments, all the sheets and components (character inserts) can be integrated together by pressing using a pressure-sensitive adhesive.

In some embodiments, another clear sheet is used as an underlying sheet to which the background sheet and the character inserts adhere, so that the background sheet and the character inserts need not adhere directly to the EL sheet, and the EL sheet can be replaced independently of the background sheet and the character inserts in the event that the EL sheet fails. The other clear sheet, the background sheet, the character inserts, and the clear cover sheet constitute an integrated laminate which is detachably attached to the EL sheet by, e.g., screws or other fastening means.

In some embodiments, the illuminated plate consists essentially of the base sheet, the EL sheet, the background sheet, the character inserts, and the clear cover sheet, wherein no other layers are provided except for adhesives. In some embodiments, the total thickness of the illuminated plate including the base sheet, the EL sheet, the background sheet (and the character inserts), and the clear cover sheet is in a range of about 1.0 mm to about 10.0 mm (typically about 2.0 µm to about 5.0 mm, typically about 2.5-3.5 mm), and the total thickness of the illuminated plate excluding the base sheet and the EL sheet is in a range of about 0.2 mm to about 2.0 µm (typically about 0.4 mm to about 1.0 mm).

The illuminated plate can be used as a license plate as follows, for example. To begin, a customer renews his or her vehicle registration or orders a license plate through the Department of Motor and Vehicles (DMV). The DMV then reviews and approves the customer's request and send the order to the plate manufacturing site. Trained personnel at the manufacturing site then review the order and enter the plate request into a computer-based information system database. Once all the information has been verified and inputted into the database, the data is then transferred to the production and design station where the plate is designed and assigned the appropriate font, text, and graphics with the use of specialized computer software. The design and specification of the license plate is then sent to the printing terminal where the plate is created and printed using a thermal transfer printer. To finish, the license plate is assembled with an electroluminescent (EL) strip, clear-sealed, and readied for delivery.

In order to construct this new type of license plate, a government entity or business can have the opportunity to install a computer-integrated production system that can be easily incorporated into any company's current manufacturing facility. For the initial stages, this new system can be set up off site before it is integrated into current license plate manufacturing sites. This new system can allow for production, design, and records management, all combined into one site. Training is a vital part of the production process. As such, training procedures can be conducted in order to prepare staff for the new technology and software as well as the required assembly of the new license plate.

The illuminated plate as a license plate can result in not only an increase in safety but also additional sources of revenue for government entities. Additionally, the illuminated license plate can produce key benefits that support the efforts of law enforcement and government departments. This illuminated vehicle identification can increase plate visibility, legibility, and durability, such as improved UV protection and weatherproofing. Law enforcement officials can more easily identify vehicles along the roadside or highway with this new product. A government agency can also immediately benefit from adopting this new illuminated license plate and production system. Employers at the production site can have the opportunity to provide training to help workers diversify and update their skill set and increase their knowledge of new technology. With electronic data management and processing and thermal transfer printing, this updated system can speed up the production process and thus, can ensure cost saving opportunities. Furthermore, government agencies can seamlessly integrate this production process into their current systems, more efficiently track and monitor requests and registrations, and produce high quality license plates for their constituents.

The illuminated plate can be used as a dealer plate as follows, for example. To begin, a vehicle dealership or similar entity contracts a license plate manufacturer to produce a personally branded plate. Once the information has been approved the design is then transferred to the production and design station where the plate is designed and assigned the appropriate font, text, and graphics with the use of specialized computer software. The design and specification of the dealer plate is then sent to the digital printing department where the plate is created. To finish, the license plate is assembled with an electroluminescent (EL) strip, clear-sealed, and readied for delivery in specified quantities. The proposed technology and production system can open doors for companies interested in capturing a new portion of the printing and manufacturing markets.

The embodiments will be explained with respect to preferred embodiments for illustrative purposes. However, the present invention is not limited to the preferred embodiments.

Figure 1:
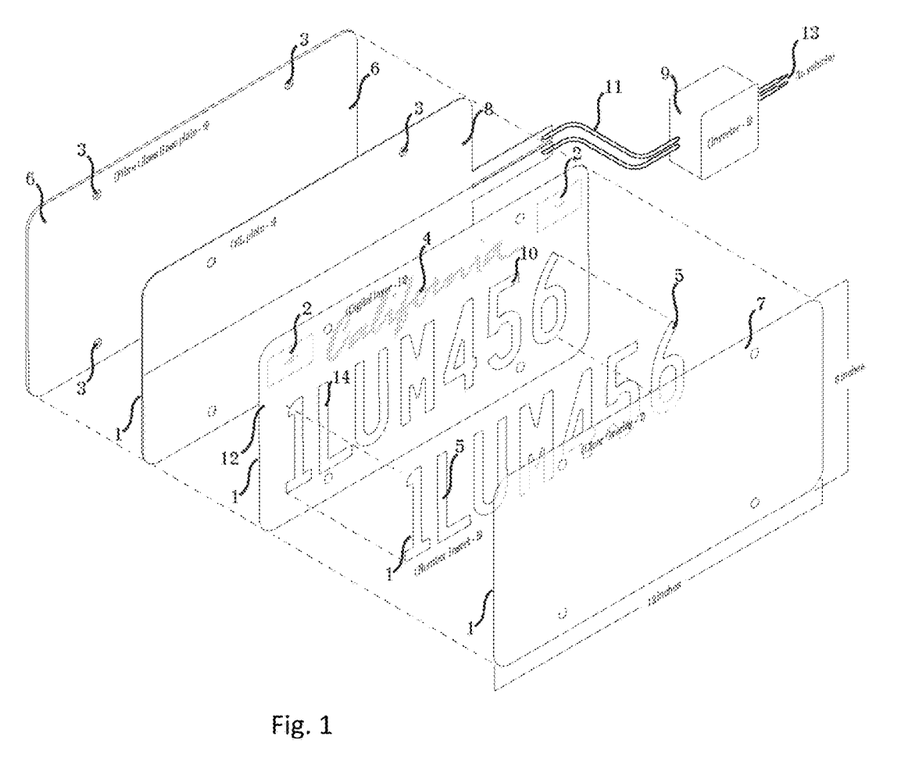
FIG. 1 is a schematic exploded view of an illuminated license plate according to an embodiment of the present invention.
Figure 2:
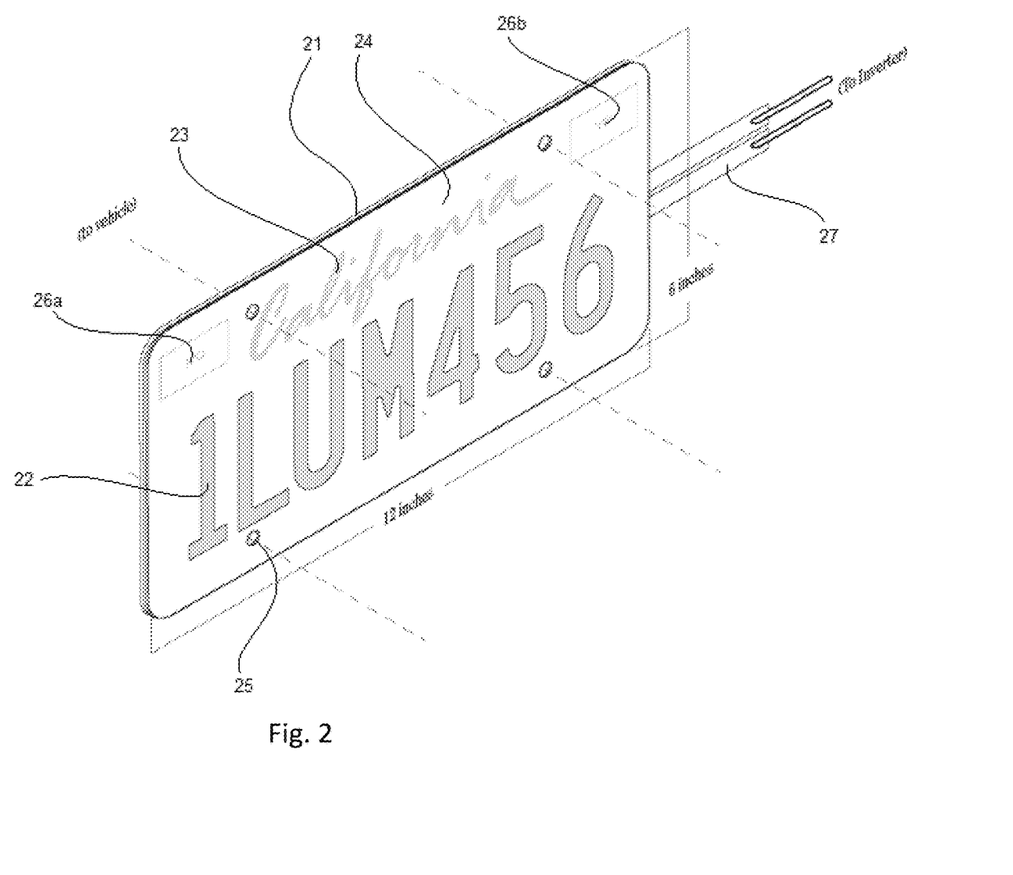
FIG. 2 is a schematic perspective view of an integrated illuminated license plate illustrated according to an embodiment of the present invention.

FIG. 1 is a schematic exploded view of an illuminated license plate according to an embodiment of the present invention. FIG. 2 is a schematic perspective view of an integrated illuminated license plate according to an embodiment of the present invention. A base or bottom sheet 6 is a 0.062-inch Fiber Glass. This base sheet is built in the same dimensions of current California license plates (6 inches high×12" inches wide) with radius edges, and corresponding vehicle bolt holes 3 for attachment purposes to the vehicle. Next, an electroluminescent (EL) sheet (also referred to as EL plate or strip) 8 is wired via cords 11 to a 12-volt DC input inverter 9 with built-in reverse polarity protection, no-load protection, short circuit protection, and a mounting platform (not shown). The inverter is then wired to the existing 12-volt license plate positive and negative lead 13 of the vehicle. The EL sheet 8 is a thin solid-copper wire coated in a phosphor—all enclosed in a clear PVC sleeve. Its thin diameter makes it quite flexible and when applied to an alternating current, the sheet glows. An alternating current electric potential of approximately 90 to 120 volts is needed for the sheet to emit light. The EL sheet 8 applied to an alternating current can in fact produce a 360° unbroken line of visible light. This EL sheet is secured on top of the fiberglass base sheet 6 via an acrylic adhesive backing 1.

After setting up the EL sheet 8, a background sheet (polyester layer, also referred to as label layer) 12 containing the license plate number cutout sections 10 and applicable digital thermal graphic prints 4 (also referred to as thermal transfer print layer) is placed onto the EL sheet (which is sandwiched between this background sheet 12 and the fiberglass base sheet 6). The thermal transfer prints 4 can provide color and UV protection and help increase the plate's durability. The digital print can also serve as the State graphic text, "California," as well as the "Month" and "Year" renewal boxes 2 to the left and right of State text. Thermal transfer printing is a digital printing process where a material is applied to another object by melting a coating of ribbon to ensure that the material stays glued to the object, to which the print is applied. Printers use a fixed-width thermal print head, pressing onto a plastic or paper label, over a driven rubber roller called a platen. Sandwiched between the print head and the label is a very thin thermal transfer ribbon, which is a polyester film which has been coated on the label side with a wax, wax-resin or pure resin "ink." The printing process is quick and can account for the fast speed of the printers and the ink sets instantly. Vinyl number inserts (character inserts) 5 are placed in the corresponding holes for numbers 10 and letters 14 (cutout section) and placed along the contours. This vinyl layer 5 of translucent opacity serves two purposes: allowing the light of the EL sheet to pass through in a blue color, and serving as the identification license plate numbers of the vehicle. The number inserts are attached to the EL sheet via an acrylic adhesive backing 1.

The final layer of the product is a clear cover sheet 7, applied for durability and protection, attached over the thermal transfer prints via an acrylic adhesive 1. The clear cover sheet is created using a clear coat machine. All sheets and components are held together by each pressure-sensitive permanent adhesive 1. When completely assembled, the license plate emits a glow from the EL sheet, which lights up the license plate and graphics and offers better visibility and legibility. The character inserts are attached to the EL sheet via the acrylic adhesive backing 1. An assembled unit comprises all the above listed components (except for the inverter) in a single unit illustrated in FIG. 2.

As illustrated in FIG. 2, the license plate is constituted by a sealed laminate 21 as illustrated in FIG. 1, and strips 27 for attaching to an inverter. The license plate has license plate numbers (characters) 22 which shine more intensively than a background 24. The background 24 may be transparent or translucent so that a State graphic text 23 which is constituted by a thin layer of a thermal transfer print also can shine at an illumination intensity lower than the illumination intensity of the characters 22. A Month 26a and a Year 26b can also be constituted by a thermal transfer print as with the characters 23. When the Month 26a and Year 26b are reflective sticker labels, the Month 26a and Year 26b do not shine because they do not pass light therethrough. However, because they are reflective, they are visible at night when light is emitted on the sticker labels. Alternatively, the background 24 is reflective and does not pass light therethrough, as with the Month and Year sticker labels. Thus, only the characters 22 distinctively shine at night, but when light is emitted onto the license plate, the background 24 also shines by reflection, rendering the entire plate clearly visible. The license plate has holes 25 for mounting the plate to a vehicle by screws. When the plate is replaced, the entire laminate including the base sheet and the EL sheet can be replaced. Alternatively, only a sealed laminate of the background sheet, the character inserts, and the clear cover sheet (wherein another clear sheet is attached to the backside of the background sheet) can be replaced without replacing the base sheet and the EL sheet.

Figure 3:
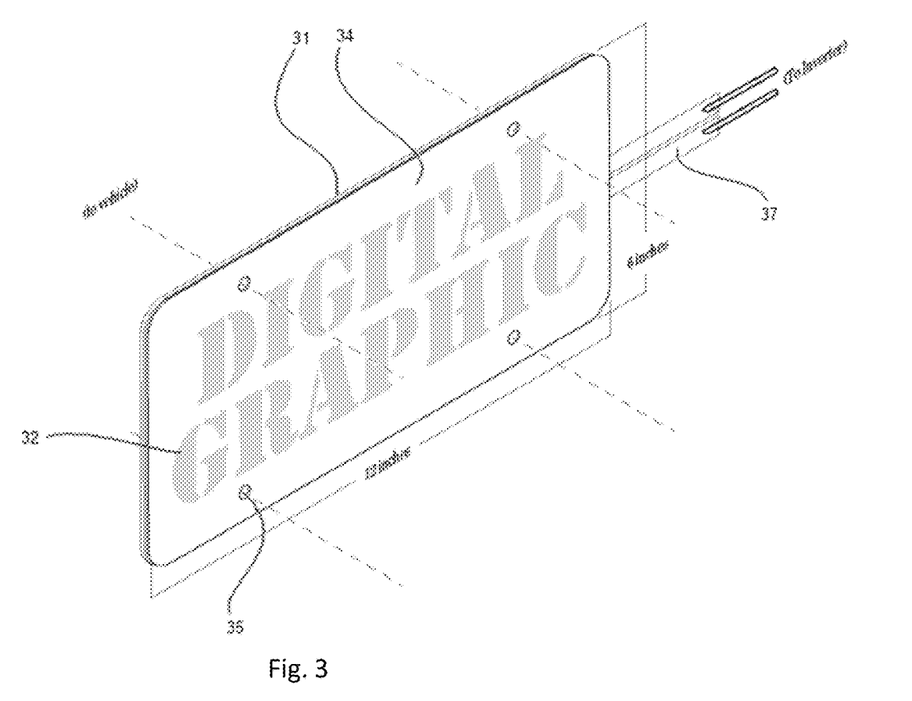
FIG. 3 is a schematic perspective view of an illuminated dealer plate according to an embodiment of the present invention.

FIG. 3 is a schematic perspective view of an illuminated dealer plate according to an embodiment of the present invention. The dealer plate has structures substantially similar to those of the license plate. As illustrated in FIG. 3, the dealer plate is constituted by a sealed laminate 31 as with that illustrated in FIG. 1, and strips 37 for attaching to an inverter. The dealer plate has dealer identification characters 32 which shine more intensively than a background 34. The background 34 may be transparent or translucent so that the background 34 also can shine at an illumination intensity lower than the illumination intensity of the characters 32. Alternatively, the background 34 is reflective and does not pass light therethrough. Thus, only the characters 32 distinctively shine at night, but when light is emitted onto the dealer plate, the background 34 also shines by reflection, rendering the entire plate clearly visible. The background 34 can also have any prints of interest, like the State graphic text 23. The dealer plate has holes 35 for mounting the plate to a vehicle by screws. When the plate is replaced, the entire laminate including the base sheet and the EL sheet can be replaced. Alternatively, only a sealed laminate of the background sheet, the character inserts, and the clear cover sheet (wherein another clear sheet is attached to the backside of the background sheet) can be replaced without replacing the base sheet and the EL sheet.

Figure 4:
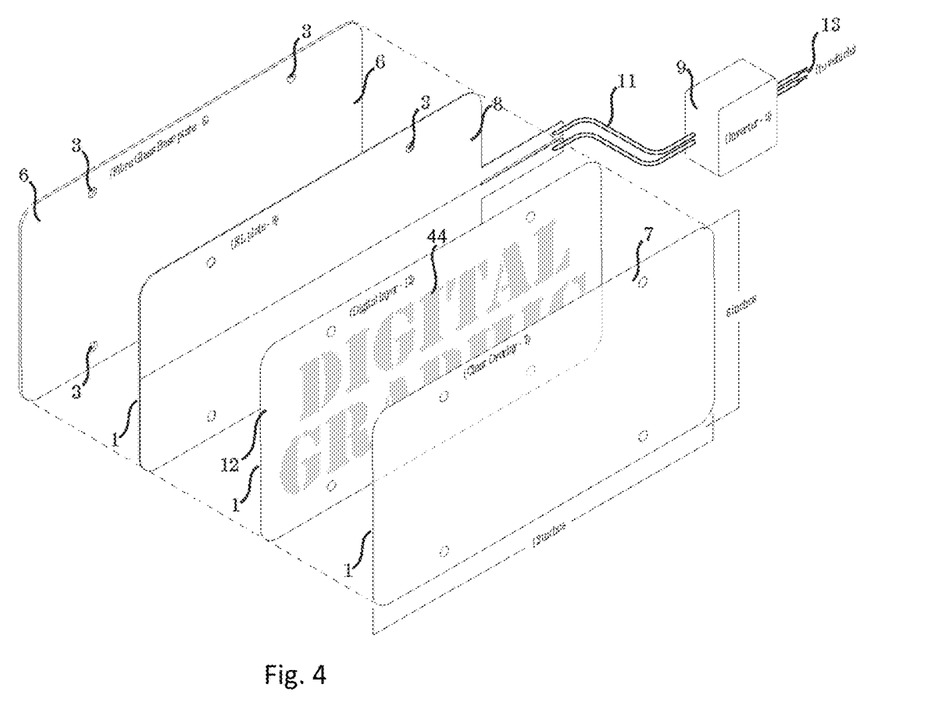
FIG. 4 is a schematic exploded view of an illuminated dealer plate according to an embodiment of the present invention.

FIG. 4 is a schematic exploded view of an illuminated dealer plate according to another embodiment of the present invention. In this figure, the elements having reference numbers which are the same as in FIG. 1 indicate that the elements are structurally and materially substantially the same as those disclosed herein in relation to FIG. 1. Thus, explanation of the same elements is omitted. In this figure, the background sheet 12 in FIG. 1 is referred to as a "dealer sheet" since the sheet includes complete information to be illuminated, which information is indicated using a print layer 44. The information includes, but is not limited to, dealer identification and advertisement which allow for auto dealership's manufacturing agencies to capture a new market and technology for vehicle plate production. This embodiment offers a temporary illuminated license plate having increased visibility and branding with a strong light brilliance. This type of license plate can ensure increased safety in various driving conditions. In some embodiments, the print layer 44 on the dealer sheet is formed by thermal transfer printing. The laminated plate looks like that illustrated in FIG. 3. Since no character inserts are used, the production process can be simplified. All the modifications described in relation to the embodiment illustrated in FIGS. 1 to 3 can be applied to this embodiment.

In some embodiments, the configurations of the dealer plate illustrated in FIG. 4 can be applied also to a license plate or any other plates, such as road traffic signs and street signs.

This new and innovative technology can greatly serve interested individuals, companies, and government agencies. The illuminated plate and its production process can greatly contribute to plate manufacturing and vehicle identification and registration management. Also, this product can potentially become an additional source of revenue for any company. As mentioned previously, this new plate provides increased safety, visibility, legibility, and durability and its production can be easily incorporated into any current plate manufacturing system.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. An illuminated plate for motor vehicles, comprising:
a base sheet configured to be mounted to a motor vehicle;
an electroluminescent sheet for providing illumination configured to be connected to an inverter, said electroluminescent sheet being overlaid on the base sheet;
a background sheet which is transparent, translucent, or reflective, and which has a cutout section constituted by openings shaped in two or more figures for display, said background sheet being overlaid on the electroluminescent sheet;
character insert sheets which are flat and transparent and shaped in the said two or more figures, said character insert sheets being infixed in the corresponding openings of the two or more figures in the cutout section, wherein the background sheet and the character insert sheets have different transparent colors and shades, wherein the background sheet and the character insert sheets have substantially the same thickness which is in a range of about 50 µm to about 1,000 µm, wherein the character insert sheets are slightly smaller than the openings constituting substantially the same dimensional figures as the two or more figures so as to form a void between contours of the openings and peripheries of the character insert sheets along an entire contour of each figure, said void being defined by inner and outer peripheries which have substantially the same dimensional shape as the contour of each figure, wherein each figure shines in a color and shade different from those of an area corresponding to the void along the contour of the figure;
a clear underlying sheet to which the background sheet and the character inserts adhere in a manner that the background sheet and the character inserts are overlaid on the electroluminescent sheet via the clear underlying sheet, wherein a backside of each of the background sheet and the character insert sheets has an acrylic adhesive layer for adhering to the clear underlying sheet; and
a clear cover sheet which is overlaid on the background sheet and the character insert sheets for protection so that the character insert sheets and the background sheet are visible through the clear cover sheet.

2. The illuminated plate according to claim 1, wherein the electroluminescent sheet is constituted by a laminate containing a phosphor layer.

3. The illuminated plate according to claim 1, wherein the background sheet is transparent or translucent, and includes a print layer formed thereon.

4. The illuminated plate according to claim 3, wherein the print layer on the background sheet is formed by thermal transfer printing.

5. The illuminated plate according to claim 1, wherein the background sheet is reflective and includes a print layer formed thereon.

6. The illuminated plate according to claim 1, wherein the background sheet is made of polyester.

7. The illuminated plate according to claim 1, wherein the character insert sheets are made of vinyl.

8. The illuminated plate according to claim 1, wherein the two or more figures for display formed in the background sheet are license plate numbers of the motor vehicle.

9. The illuminated plate according to claim 1, wherein the two or more figures for display formed in the background sheet are those indicating vehicle dealer identification.

10. The illuminated plate according to claim 1, wherein the base sheet is made of fiberglass.

11. The illuminated plate according to claim 1, further comprising the inverter which is a 12-volt DC input inverter.

12. An illuminated dealer plate temporarily installed to a motor vehicle in place of a license plate, comprising:
- a base sheet configured to be mounted to a motor vehicle;
- an electroluminescent sheet for providing illumination configured to be connected to an inverter, said electroluminescent sheet being overlaid on the base sheet;
- a dealer sheet which is transparent, translucent, or reflective, and which includes a print layer formed thereon, said dealer sheet being overlaid on the electroluminescent sheet, said dealer sheet having a cutout section constituted by openings shaped in two or more figures for display;
- character insert sheets which are flat and transparent and shaped in the said two or more figures, said character insert sheets being infixed in the corresponding openings of the two or more figures in the cutout section, wherein the dealer sheet and the character insert sheets have different transparent colors and shades, wherein the dealer sheet and the character insert sheets have substantially the same thickness which is in a range of about 50 μm to about 1,000 μm, wherein the character insert sheets are slightly smaller than the openings constituting substantially the same dimensional figures as the two or more figures so as to form a void between contours of the openings and peripheries of the character insert sheets along an entire contour of each figure, said void being defined by inner and outer peripheries which have substantially the same dimensional shape as the contour of each figure, wherein each figure shines in a color and shade different from those of an area corresponding to the void along the contour of the figure;
- a clear underlying sheet to which the background sheet and the character inserts adhere in a manner that the background sheet and the character inserts are overlaid on the electroluminescent sheet via the clear underlying sheet, wherein a backside of each of each of the background sheet and the character insert sheets has an acrylic adhesive layer for adhering to the clear underlying sheet; and
- a clear cover sheet which is overlaid on the dealer sheet for protection so that the dealer sheet with the print layer is visible through the clear cover sheet.

13. The illuminated dealer plate according to claim 12, wherein the print layer on the dealer sheet is formed by thermal transfer printing.

* * * * *